United States Patent
Cardonha et al.

(10) Patent No.: US 10,671,681 B2
(45) Date of Patent: Jun. 2, 2020

(54) TRIGGERING PERSONALIZED SEARCH QUERIES BASED ON PHYSIOLOGICAL AND BEHAVIORAL PATTERNS

(71) Applicant: International Business Machines Corporation, Armonk, NY (US)

(72) Inventors: Carlos H. Cardonha, Sao Paulo (BR); Marco A. S. Netto, Sao Paulo (BR); Vagner F. D. Santana, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 15/270,062

(22) Filed: Sep. 20, 2016

(65) Prior Publication Data

US 2018/0081973 A1  Mar. 22, 2018

(51) Int. Cl.
*G06F 16/9535* (2019.01)
*G06F 16/248* (2019.01)
*G06F 16/2457* (2019.01)

(52) U.S. Cl.
CPC ........ *G06F 16/9535* (2019.01); *G06F 16/248* (2019.01); *G06F 16/24575* (2019.01)

(58) Field of Classification Search
CPC ......... G06F 17/30528; G06F 17/30554; G06F 17/30867; G06F 16/9535; G06F 16/24575
USPC ........................................................ 707/722
See application file for complete search history.

(56) References Cited

U.S. PATENT DOCUMENTS

| 8,095,522 | B2 | 1/2012 | Welti et al. |
| 8,126,882 | B2 * | 2/2012 | Lawyer ............... G06Q 10/063 707/723 |
| 8,498,974 | B1 | 7/2013 | Kim et al. |
| 8,631,001 | B2 | 1/2014 | Lawrence et al. |
| 8,650,210 | B1 | 2/2014 | Cheng et al. |
| 8,781,450 | B2 | 7/2014 | Behzad et al. |
| 8,832,132 | B1 | 9/2014 | Spertus et al. |

(Continued)

FOREIGN PATENT DOCUMENTS

WO     2015002762 A1    1/2015

OTHER PUBLICATIONS

Anonymous, "Interactive Real-Time Anatomy Query System for Rapid Prototyping", IP.com, Sep. 23, 2014, 6 pages.

(Continued)

*Primary Examiner* — Shahid A Alam

(74) *Attorney, Agent, or Firm* — Scully, Scott, Murphy & Presser, P.C.

(57) ABSTRACT

A user interaction with a computer device is monitored, the user interaction comprising at least user consuming material via the computer device. Content of the material the user is consuming is identified. Physiological pattern generated by the user while consuming the content is captured via at a sensor device. Responsive to detecting that the physiological pattern represents an outlier, a term in the content is determined for which additional information is to be provided. The term may be determined from the content based on user knowledge, frequency of the term appearing in previous content consumed by the user and popularity of the term. A search query is executed with the determined term. Result of the search query may be filtered based on the user's knowledge. The filtered result and at least one of the previous content containing the term the user has previously consumed is presented.

20 Claims, 8 Drawing Sheets

(56) References Cited

U.S. PATENT DOCUMENTS

| | | | |
|---|---|---|---|
| 8,930,350 | B1 | 1/2015 | Herscovici et al. |
| 9,035,760 | B2 | 5/2015 | Reilhac et al. |
| 9,173,567 | B2 | 11/2015 | Jain et al. |
| 10,095,748 | B2 | 10/2018 | Krinker et al. |
| 2006/0074883 | A1 | 4/2006 | Teevan et al. |
| 2012/0030234 | A1 | 2/2012 | Ramachandrula et al. |
| 2012/0289788 | A1* | 11/2012 | Jain .............. G06F 19/3418 600/301 |
| 2014/0280033 | A1 | 9/2014 | Zheng et al. |

OTHER PUBLICATIONS

Bernstein, M.S., et al., "Direct Answers for Search Queries in the Long Tail", Proceedings of the SIGCHI Conference on Human Factors in Computing Systems (CHI '12), May 5-10, 2012, pp. 237-246.

Dhakshinamurthy, P., "Personalized DeepLinks in Search Engine Results Page", IP.com, Jul. 25, 2011, 5 pages.

Hassan, A., et al., "Struggling or Exploring? Disambiguating Long Search Sessions", Proceedings of the 7th ACM International Conference on Web Search and Data Mining (WSDM '14), Feb. 24-28, 2014, 10 pages.

Hofmann, K., et al., "An Eye-tracking Study of User Interactions with Query Auto Completion", Proceedings of the 23rd ACM International Conference on Information and Knowledge Management (CIKM '14), Nov. 3-7, 2014, 10 pages.

Li, X., et al., "Learning Query Intent from Regularized Click Graphs", 31st Annual International ACM SIGIR Conference on Research and Development in Information Retrieval (SIGIR '08), Jul. 20-24, 2008, 8 pages.

Marcos, M., et al., "A User Study of Web Search Session Behaviour Using Eye Tracking data", Proceedings of the 26th Annual BCS Interaction Specialist Group Conference on People and Computers (BCS-HCI '12), Sep. 2012, pp. 262-267.

Milan-Cifuentes, J.D., et aL, "Curiousity driven search: When is relevance irrelevant?" Proceedings of the 5th Information Interaction in Context Symposium (IIiX '14), Aug. 26-29, 2014, 5 pages.

Ruotsalo, T., et al., "Interactive Intent Modeling: Information Discovery Beyond Search", Communications of the ACM, Jan. 2015, pp. 86-92, vol. 58, No. 1.

Tran, V.T., et al., "Using Eye-Tracking with Dynamic Areas of Interest for Analyzing Interactive Information Retrieval", Proceedings of the 35th International ACM SIGIR Conference on Research and Development in Information Retrieval (SIGIR '12), Aug. 12-16, 2012, 2 pages.

* cited by examiner

TRIGGERING PERSONALIZED SEARCH QUERIES BASED ON PHYSIOLOGICAL AND BEHAVIORAL PATTERNS

FIELD

The present application relates generally to computers and computer applications, and more particularly to automatic triggering of search queries.

BACKGROUND

Plethora of electronic information currently exist, which users may consume, for example, by going online, navigating the World Wide Web or the Internet. For instance, information may be available in the form of electronic books, web site, or even a text generated from a system transcribing speech in a meeting. The vast amount of available information also comes with information that may not be understandable by users. For example, there may be text such as words, phrases, expressions that is not known to a viewing individual, and make it difficult for the individual to fully comprehend the content. Searching for dictionary may be time consuming and may not be consistent with a particular user's knowledge.

BRIEF SUMMARY

A method and system of automatically triggering a search query may be provided. The method, in one aspect, may monitor a user interaction with a computer device, the user interaction comprising at least user consuming material via the computer device. The method may also include identifying content of the material the user is consuming. The method may further include capturing via at least one sensor device, a physiological pattern generated by the user while consuming the content. The method may also include, responsive to detecting that the physiological pattern represents an outlier, determining a term in the content for providing additional information, the term determined from the content based on user knowledge, frequency of the term appearing in previous content consumed by the user and popularity of the term. The method may also include executing a search query with the determined term. The method may further include filtering a result of the search query based on the user's knowledge. The method may also include presenting via the computer device the filtered result and at least one of the previous content containing the term the user has previously consumed.

A system of automatically triggering a search query, in one aspect, may include at least one hardware processor. A consumed content database stores summaries of consumed content and may be coupled to the hardware processor. The hardware processor may monitor a user interaction with a display device, the user interaction comprising at least user consuming material displayed on the display device. The hardware processor may identify content of the material the user is consuming. The hardware processor may capture via at least one sensor device, a physiological pattern generated by the user while consuming the content. The hardware processor, responsive to detecting that the physiological pattern represents an outlier, may determine a term in the content for providing additional information, the term determined from the content based on user knowledge, frequency of the term appearing in previous content consumed by the user and popularity of the term. The hardware processor may execute a search query with the determined term in the consumed content database and an internet. The hardware processor may filter a result of the search query based on the user's knowledge. The hardware processor may present the filtered result and at least one of the previous content containing the term the user has previously consumed via the display device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one aspect, a system and method are disclosed that detect behavioral and physiological patterns of a user while the user is consuming content. Behavioral and physiological patterns of a user may be detected that indicate that the user does not know a term or requires additional information in order to fully understand the content being consumed. Examples of behavioral and physiological patterns may include but are not limited to pupil dilation, heart beat frequency, skin conductance, for example, detected via a sensor device. Examples of the content the user consumes may include but are not limited to text, image, audio, and video. The system and method in one embodiment may catalog the behavioral and physiological patterns and trigger search queries to provide unknown information automatically. The queries may be customized based on the user's prior knowledge. The system and method in one embodiment generates a personalized search query based on physiological and/or behavioral patterns. The personalized search query may be constructed also based on the user's knowledge.

The system and method may include cataloging physiological and/or behavioral patterns while users are consuming content and collecting terms and/or subjects that the user has familiarity with. Responsive to detecting a physiological or behavioral pattern related to information finding actions, the system and method of the present disclosure in one embodiment triggers search queries considering definitions for the identified unknown terms and personalized examples of the unknown term combined with subjects that the user is familiar with.

The system and method of the present disclosure in one embodiment may implement a machine learning technique to detect a physiological pattern. The system, for example, in one embodiment may retrieve content from sources which are consumed by the user. The system may verify the frequency with which each word is visualized by the user. For example, if a user enjoys cooking, the user may visit several sites with recipes. In these recipes, common ingredients may be there such as "salt", "pepper", and others. The system can determine the frequency of these words or terms occurring in the website and create a database with words or terms, and the frequency with which they appear in the documents consumed by the user. For instance, words or terms occurring for a threshold number of times may be selected. These databases are used for machine learning techniques as they require data to increase their accuracy.

Figure 1:
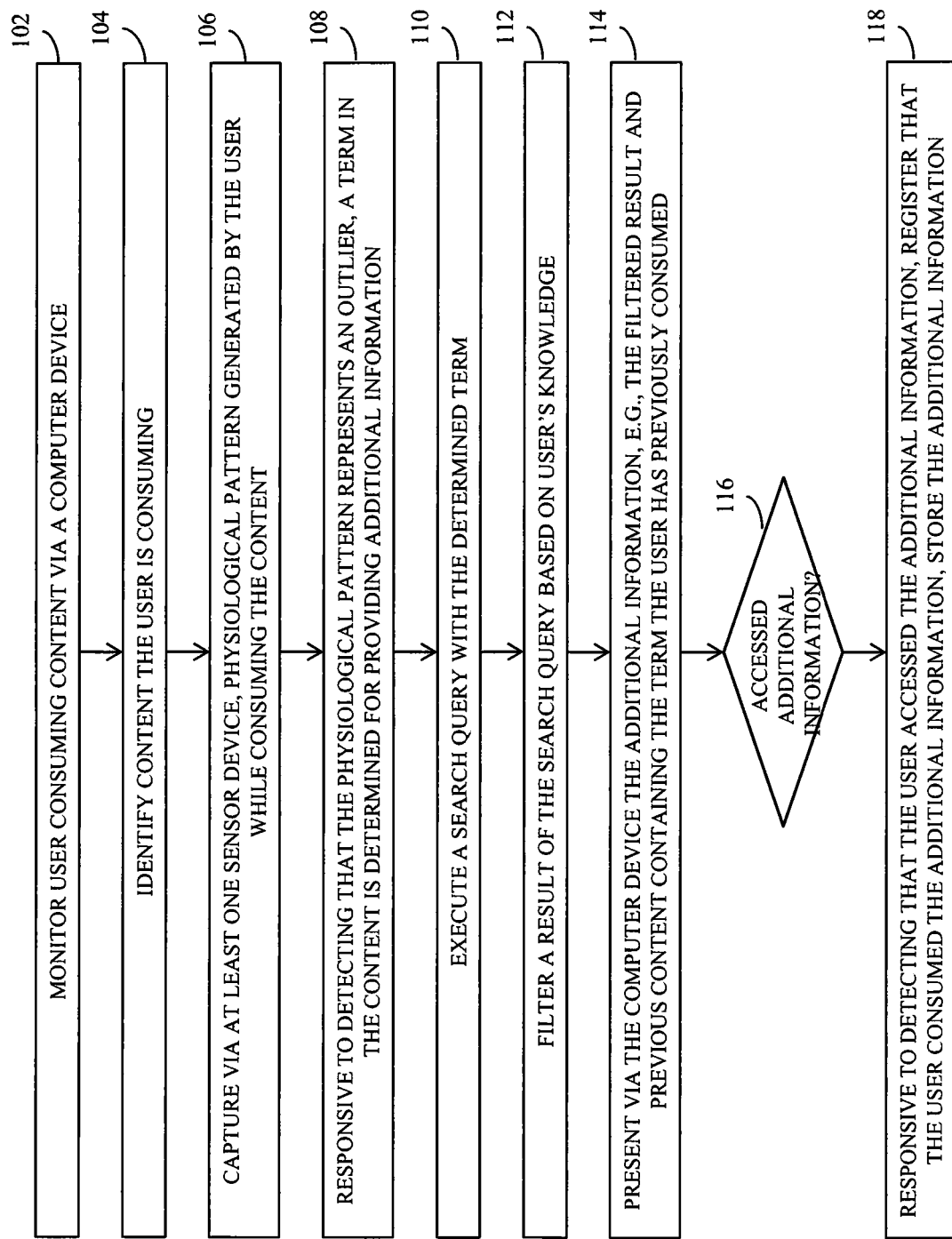
FIG. 1 is a diagram illustrating a method of automatically triggering personalized search queries, for example, considering user's knowledge and physiological and behavioral pattern in one embodiment of the present disclosure.

FIG. 1 is a diagram illustrating a method of automatically triggering personalized search queries, for example, considering user's knowledge, and physiological and/or behavioral pattern in one embodiment of the present disclosure. At least one hardware processor may perform the method. At 102, user interaction with a computer device is monitored. The user interaction includes at least user consuming material via the computer device. For example, user consumes content and such consumption may be detected by the hardware processor.

At 104, content of the material the user is consuming is identified. The content may be identified, for example, based on the data that is displayed on a screen or display device the user is viewing. The content may be also identified by following or detecting user's eye sight or field of view, which may be sensed via a sensor device. A system of the present disclosure, for example, may capture the content being consumed by the user, for example, part of document appearing on the screen, for example, by utilizing eye sight detection sensor to detect the area of the document on the screen the user is focusing on. As an example, cameras from mobile devices such as smartphones, tablets, laptops can be used for eye tracking.

At 106, physiological pattern generated by the user while consuming the content is captured via at least one sensor device. For example, a system of the present disclosure in one embodiment may capture behavioral and/or physiological pattern(s) generated by the user using a sensor for measuring the behavioral and/or physiological pattern. Such sensor or sensors may be deployed on stand-alone devices, for example, eye tracker sensor, microphone, or on the device being used by the user to consume content, for example, sensors of smartphone.

The system in one embodiment may identify via one or more sensors abnormal behavioral and/or physiological pattern or patterns, for example, mouse device movement, pupil dilation, heart beat frequency, skin conductance, generated by the user while the user consumes the content. In another aspect, the system is trained, for example, via classification algorithm or another machine learning algorithm to identify configurations of physiological pattern or patterns that indicate whether that particular the user does not know a term or requires additional information in order to fully understand the content being consumed. For instance, while a user is reading a document, a machine learning algorithm can detect whether the user is having difficulty understanding terms the user is not familiar with. As an example, a machine learning technique can use the following features: speed to consume a sentence (based on eye tracking) and complexity of the sentence (number of terms user is not familiar with based on previous consumed material). While the user consumes the material, the system in one embodiment verifies the speed the user is reading sentences. If for a given sentence the speed is slower than usual for that user and the complexity of the terms in the sentence (for that user) is higher than what the user knows, a query to look up the meaning of the term (the user has little or no familiarity) is triggered.

At 108, responsive to detecting that the physiological pattern represents an outlier, a term in the content is determined for providing additional information. The term is determined based on user's knowledge, word frequency, and popularity of the term. For instance, the system in one embodiment may capture the content being presented to the user and identify the pieces which are more likely to require clarifications. In one embodiment, one or more terms may be selected from the content based on user knowledge, frequency of the term or terms appearing in previous content consumed by the user and popularity of the term or terms. As another example, the system may identify one or more words in the region being visualized by the user with smallest visualization frequency, for example, as determined in a training phase. For example, the words in the region which the user has not previously seen or infrequently seen (as determined based on a threshold frequency value) may be input into a search operation or search engine.

At 110, a search query is executed with the determined term. For example, based on identified content that may need more clarification, the system in one embodiment may trigger a search operation using those elements (e.g., term or terms) as input data. In one embodiment, executing a search query may include performing a search for the terms in sources such as content that has been already consumed and saved previously, performing an Internet search, for example, in encyclopedia web sites, social networks, web sites having books, web sites having publications, other Internet sites, and other sources.

At 112, the result returned from the search query may be filtered based on user's knowledge and/or background, for example, so as to provide a focused result that helps the user's understanding.

At 114, the filtered result may be presented. Previous content the user has previously consumed and that contains the term may be presented via the computer device also. The system in one embodiment may present clarification messages to the user, which for example, include a result or results from search queries. For example, the system in one embodiment may return the meaning or synonym(s) of the term or word together with one or more examples containing the word that have been visualized by the user before, for example, to help the user to recall previous understanding of the word. The meaning of the term and previous content that includes the term (also collectively referred to as additional information) may be presented, for example, by presenting an interactive element on the computer device, or on the user interface of the computer device, for example, a display on which the user is consuming the content. Examples of the interactive element, for example, a user interface element, may include a slide bar, tooltips icon, or another user interface element embedded or incorporated into the user interface display. In one embodiment, responsive to detecting that the interactive element is selected, the additional information may be presented or displayed on the user interface display or display device.

In one embodiment, the result of the query may be filtered or sorted according to the user's knowledge of the term or subject. For instance, if a query is triggered for a person with information technology (IT) background, the system in one embodiment may identify an explanation and/or example where the query result appears in this context, for example, providing results of already consumed content, which can be referenced for easier understanding. For example, queries involving the word "Cloud" will have as results phrases about Cloud Computing and virtualization, for example, with links to sites that provide the information such as thesaurus and encyclopedia sites, with previously read IT text. The result will not have phrases such as "a visible collection of particles of water". In one embodiment, the system may adjust the depth of the content presented to the user based on the behavioral and/or physiological signals. For instance, if the number of user's blinks per time period exceeds a threshold value, for example, with an accelerated heart beat exceeding a threshold value, more comprehensive explanation may be presented to the user than would have been presented to a user who for example, blinked less the a threshold number of times when viewing a given unknown term or a region where the given unknown term is shown on a display.

In one embodiment, the system may trigger a query proactively, considering physiological feedback, users' knowledge and popularity of the terms. The system in one embodiment may identify automatically (or anticipate automatically) search requests the user may conduct based on sensed data. The level of user's own knowledge may be identified and used in determining the way the query results are presented, for example, a term is explained using an example that easier for the user to understand. Thus, in one embodiment, the system may explore user's knowledge for selecting information and presenting the information to the user.

At 116, it is determined whether the user accessed the additional information, for example, the filtered result with the previous content that may provide clarifications for the user's understanding of the content being consumed. For instance, it is detected whether the interactive element such as the slide bar, tooltip or another user interface element has been selected or pressed, for example, by user using an input device, responsive to which selection the additional information is displayed or presented for user access.

At 118, responsive to detecting that the user accessed the additional information, consumption of the additional information by the user is registered. For example, the information that the user consumed the additional information may be stored in a database. The database may also store the additional information.

Figure 2:
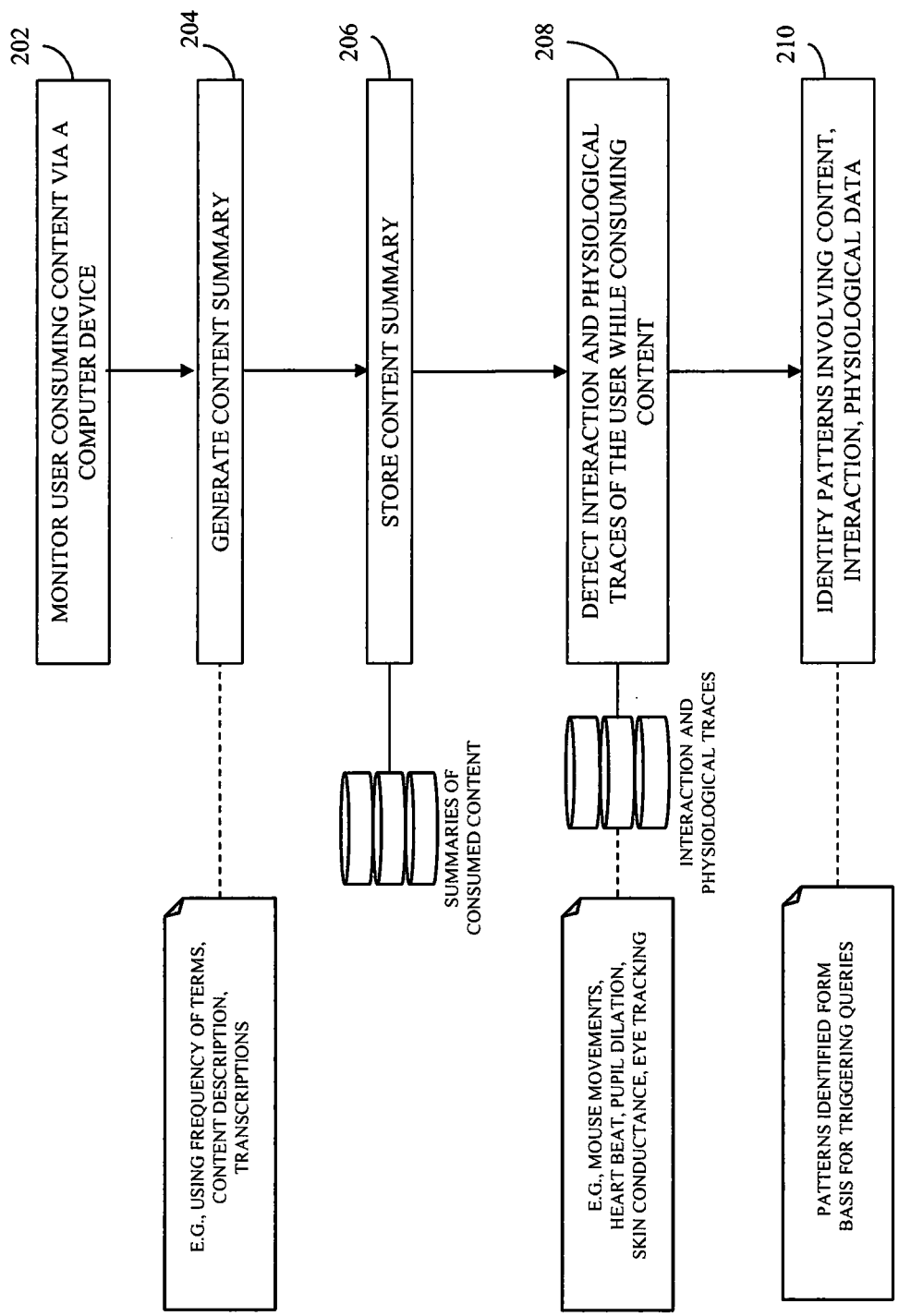
FIG. 2 is a diagram illustrating a training phase for training a machine in one embodiment to learn to detect outliers or abnormal behavior in a user's physiological and/or behavioral pattern in consuming content.

FIG. 2 is a diagram illustrating a training phase for training a machine in one embodiment to learn to detect outliers or abnormal behavior in a user's physiological and/or behavioral pattern in consuming content. At 202, user consuming content is monitored. Consuming content may include viewing content displayed on a display device. Consuming of the content may also include listening to the content via an audio device. At 204, summary of the content consumed by the user is generated. For example, terms or words and frequency of those terms or words appearing in the content are generated. Content description and/or transcription may be generated. Summary may include a table containing in each row: (i) word and (ii) frequency. In one embodiment, common words or stop words can be skipped (e.g., "in", "a", "the", "for"). Description may include the "category" of the words, for example: information technology (IT), cooking, medicine. The categories can be obtained by collecting material (e.g., publications, web sites, blogs, and others) and classifying common terms in each category.

At 206, the generated content summary is stored in a database in a storage device.

At 208, interaction and physiological traces while consuming content are detected, for example, via one or more sensors, and stored in an interaction and physiological traces database in a storage device. For example, mouse movements while the user is consuming (e.g., viewing) content may be detected and stored. For instance, the amount of movement of the mouse, the speed of movement, the mouse movement or displacement pattern with timing, may be detected and stored. Heart beat of the user, eye movement, pupil dilation, and/or skin conductance while consuming content, may be also detected and stored. For example, an operating system of the computer device with which the user is interacting, may constantly or continuously capture information associated with the user's interaction, for example, with touch screens, and mouse movement on a display device. In one embodiment, each event is captured together with its type description and timestamp. Other information may also be captured. As another example, biometric sensors may also collect periodically information about key performance indicators (KPIs) being measured. For instance, an eye movement tracker identifies the position in the screen being gazed by the user as well as the moment (or time-stamp) in which this event is taking place; heart beat sensors register periodically (e.g., every second) the current frequency. With time stamps, the system one can cross-relate the collected information in order to infer the biological reaction while consuming a specific piece of content.

At 210, patterns involving content, interaction, and physiological data are identified and stored. For instance, a user reading a text having terms the user is familiar with may perform this task while blinking 20 times per minute and with 90 heart beats per minute. In one embodiment, average values for metrics captured by other sensors can be similarly collected and inferred. The identified patterns are used as a basis for triggering search queries. For instance, based on the detected physiological patterns, an average physiological pattern may be established for the user. Any future physiological pattern that deviates from the average physiological pattern may be detected as an outlier. For instance, if significant deviations from the average values associated with the user are identified, an outlier is detected. Whether a deviation is significant may be determined based on comparing the deviation with a threshold value. For example, if the deviation exceeds the threshold value, it is determined that the deviating pattern is an outlier. Such threshold value may be configurable.

Figure 3:
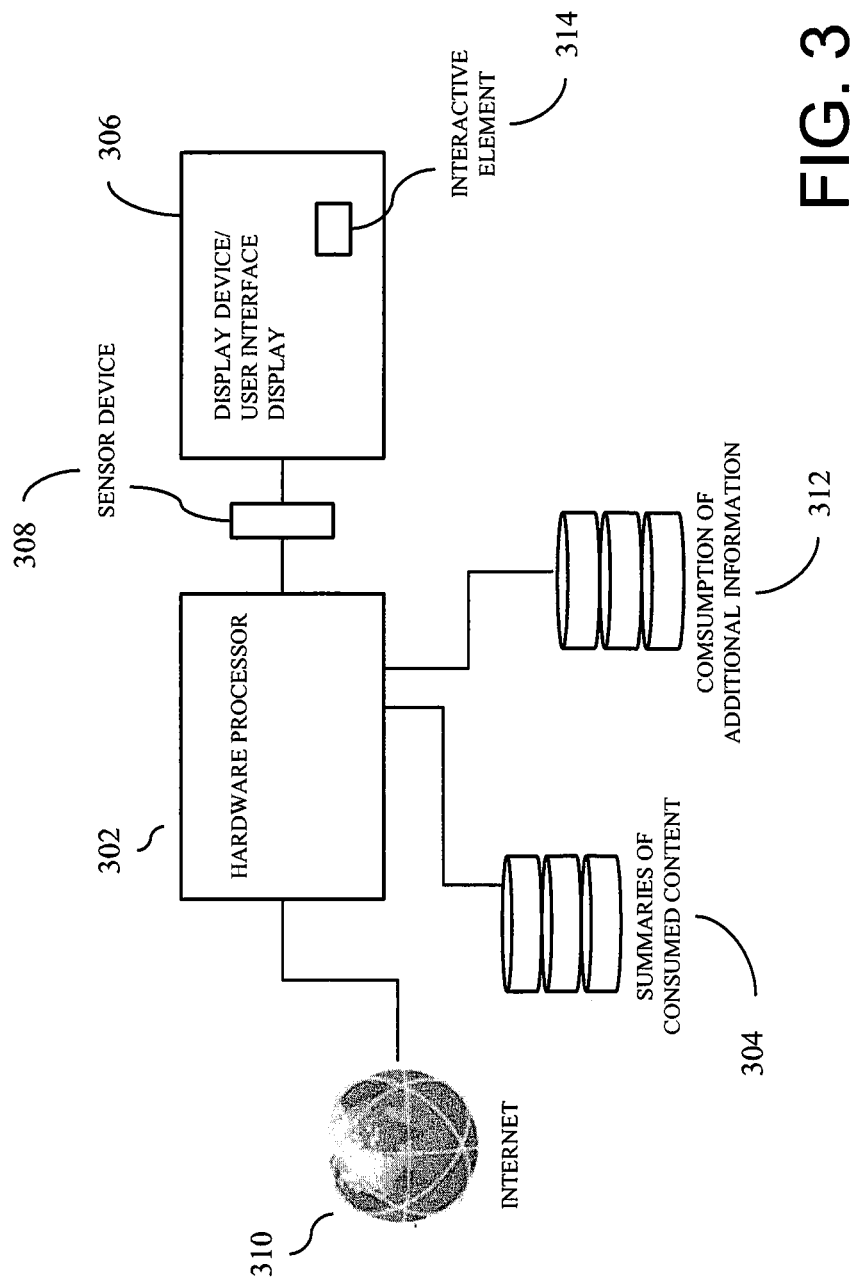
FIG. 3 is a diagram illustrating components of a system in one embodiment of the present disclosure.

FIG. 3 is a diagram illustrating components of a system in one embodiment of the present disclosure. At least one hardware processor 302 is coupled to a consumed content database 304 storing summaries of consumed content. The hardware processor 302 monitors a user interaction with a display device 306, the user interaction including at least user consuming material displayed on the display device 308. The hardware processor 302 identifies content of the material the user is consuming and captures via at least one sensor device 308, physiological pattern and/or behavioral pattern generated by the user while consuming the content. The hardware processor 302, responsive to detecting that the physiological pattern represents an outlier, determines a term in the content for providing additional information, the term determined from the content based on user knowledge, frequency of the term appearing in previous content consumed by the user and popularity of the term. The hardware processor 302 executes a search query with the determined term, for example, in the consumed content database 304 and an internet 310. The hardware processor filters a result of the search query based on the user's knowledge and presents the filtered result and at least one of the previous content containing the term the user has previously consumed via the display device 306. At least one of the previous content containing the term may be retrieved from the summaries of consumed content and/or consumption of addition al information database 312.

In one embodiment, the hardware processor 302 presents an interactive user interface element 314 on the display device 306, and responsive to detecting a selection of the interactive user interface element, the hardware processor 302 presents the filtered result and at least one of the previous content containing the term the user has previously consumed.

The additional information database 312 stores registration of consumption of additional information and coupled to the hardware processor. Responsive to detecting a selection of the interactive user interface element, the hardware processor 302 registers and stores user consumption of the filtered result and at least one of the previous content containing the term the user has previously consumed in the additional information database 312.

FIGS. 4A-4D illustrate an example web browsing use case in one embodiment of the present disclosure. The system in one embodiment may monitor the web browsing sessions, and detect that a user is reading a piece of news in a website, for example, displayed on a display screen 402. While the user is reading the news, the system detects outliers based on the behavioral pattern or patterns related to mouse movements and scrolling speed. For example, in a region 404 of the content displayed on the screen the system may detect such physiological pattern or behavioral pattern outlier. This indicates to the system that the user might need more information about the terms and/or subjects adjacent to the region of interest 404 the user is interacting with. The system then filters terms in the region of interest, for example, based on the popularity of terms 406, the fluency of the user with respect to the terms 408, and the time elapsed since the user interacted with the terms and/or subjects 410. For example, the term may have a popularity score associated with it. The system may filter the term if the popularity score of the term is less than a threshold value. The fluency of the user may also be compared with a threshold fluency value and if the fluency of the user is less than the threshold fluency, the term is filtered as a candidate for needing further clarification. Likewise, the time elapsed since the user has viewed the term may be compared to a threshold elapsed time value and if the time elapsed is greater than the threshold elapsed time value, the term may be filtered as a candidate for needing further clarification. Popularity of terms can be automatically extracted from a database containing a list of content that has been consumed by users. An example metric that indicates the popularity of a term is the frequency with which it appears (or has been consumed) by users. An individual's knowledge/familiarity with words can be similarly inferred. For instance, the knowledge of the individual is inferred from the corpus the individual read, and familiar words are those appearing (e.g., with a defined frequency) in the corpus. These operations can be performed with count operations in databases.

Figure 4A:
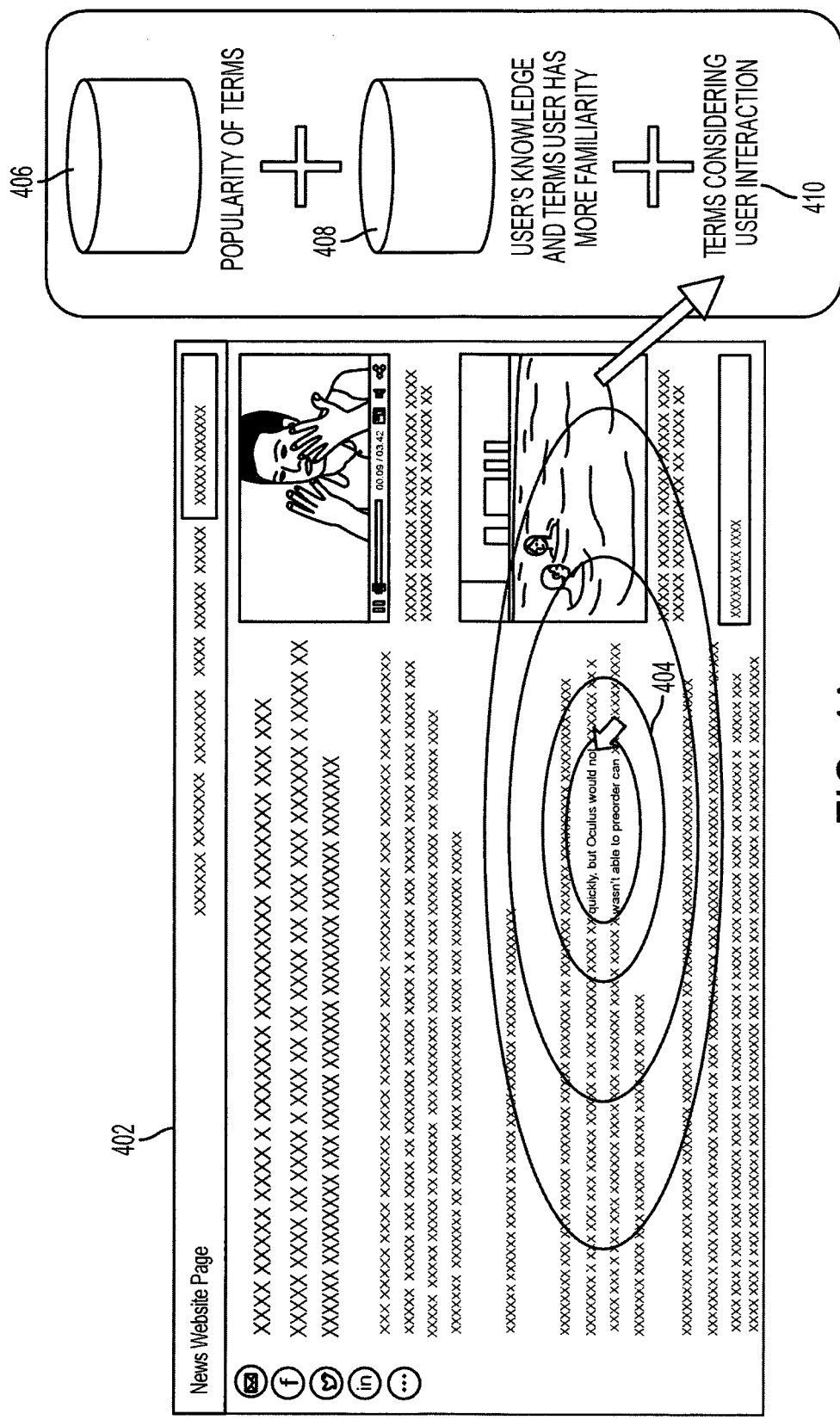
FIGS. 4A-4D illustrate an example web browsing use case in one embodiment of the present disclosure.
Figure 4B:
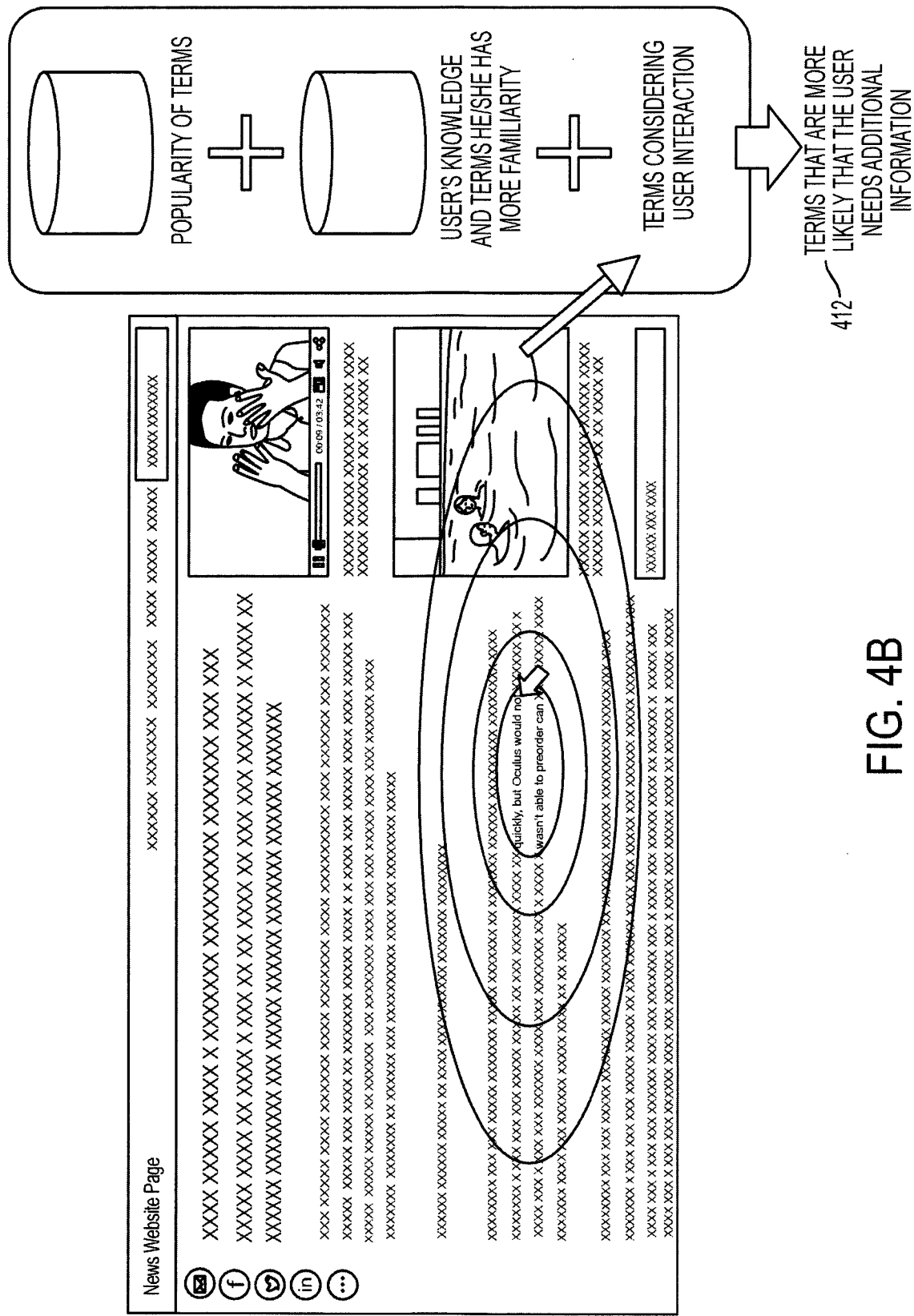
Figure 4C:
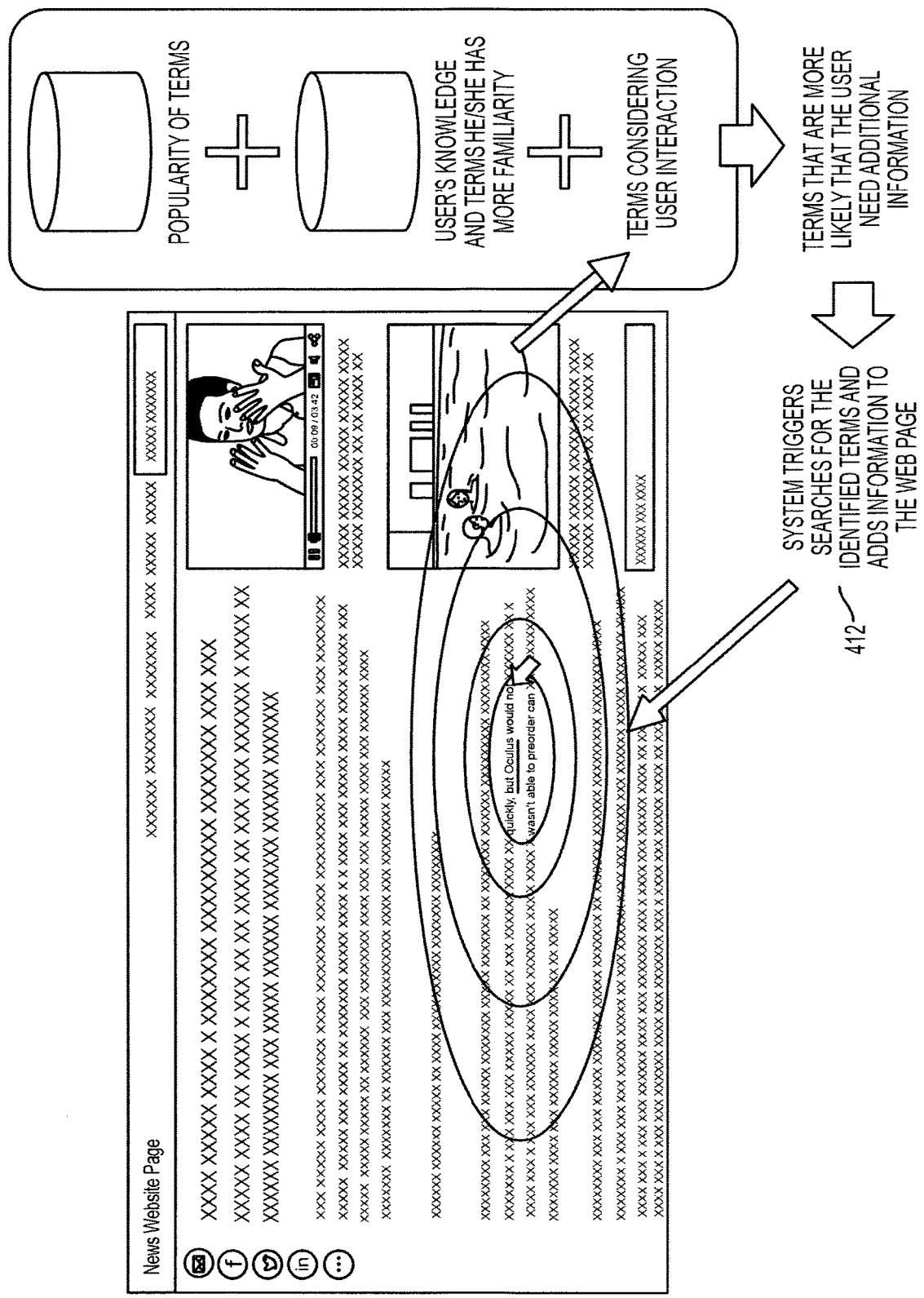
Figure 4D:
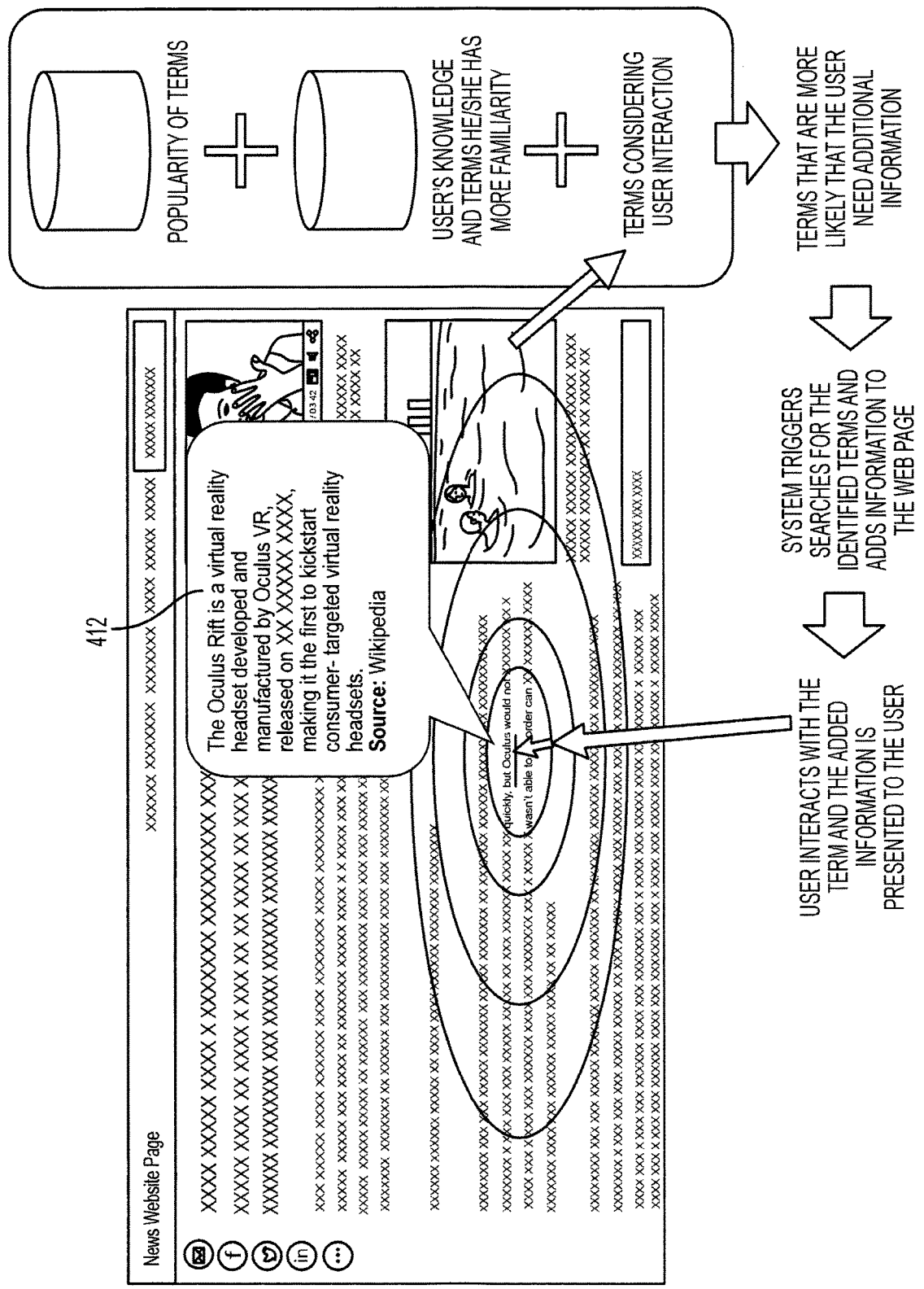

Once the terms are filtered and ranked (e.g., shown in FIG. 4B at 412), the system triggers one or more search queries for the filtered terms (e.g., shown in FIG. 4C at 414). The result of the search queries are presented to the user, for example, on the web browsing window, for example, in a pop-up panel display adjacent to the region the user is viewing. FIG. 4D at 416 shows a result automatically displayed on the display screen. Additional information may also be presented to enhance the user's understanding of the terms.

As another example, consider the following education scenario. The system in one embodiment may monitor user interaction with a device, for example, a user using an augmented reality device (e.g., a glass) for reading a book or a user interacting with multiple materials (e.g., book, blackboard) during a class. The system may detect behavioral or physiological pattern from the user in encountering a region in the book, detect unknown terms in the region and trigger search for explanations and/or definitions of the unknown terms. For example, the system may detect outliers in the consumption of content indicating probable unknown terms. The system may trigger a search for explanations and/or definitions and place the found information adjacent to the unknown terms, supporting the user in the task of understanding.

Yet another example may be in a meeting scenario. The system in one embodiment may capture audio that generates the transcription of the meeting in real-time. Based on the knowledge of the user, the system may identify terms and/or expressions the user is likely to need additional information. For example, the knowledge of the user is inferred based on the corpus the user consumes; more specifically, for each word, the number of times a user saw that content is used as KPI to indicate familiarity.

The system may trigger a search considering the identified term or terms and presents additional information to the user, for example, as a notification in the user's smartphone.

Still another use scenario may include using text and/or video during a travel. Consider that a user is using an augmented reality device (e.g., a glass). During the travel the user interacts with multiple materials (e.g., signs, texts). The system, for example, coupled to the augmented reality device, in one embodiment may detect outliers in the consumption of content indicating unknown terms or probable unknown terms. The system may trigger a search for explanation and/or definition of the unknown terms, placing the additional information next to unknown terms.

Figure 5:
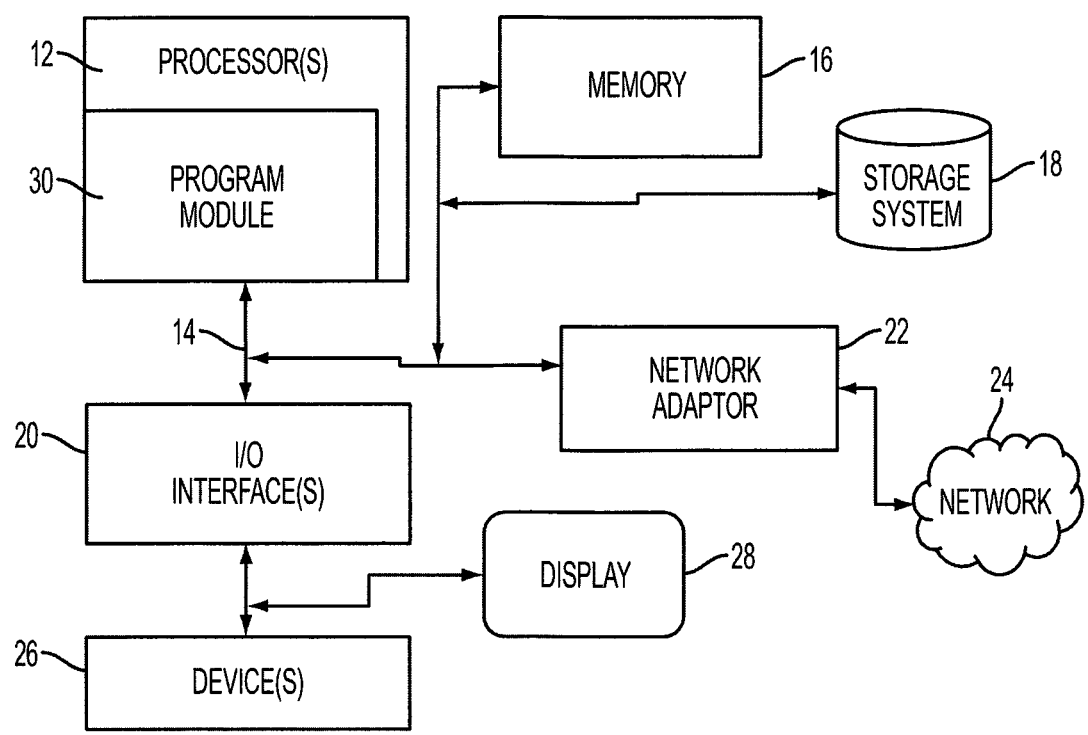
FIG. 5 illustrates a schematic of an example computer or processing system that may implement an automatic search query system in one embodiment of the present disclosure.

FIG. 5 illustrates a schematic of an example computer or processing system that may implement an automatic search query system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of automatically triggering a search query, the method performed by at least one hardware processor, the method comprising:
   monitoring a user interaction with a computer device, the user interaction comprising at least user consuming material via the computer device;
   identifying content of the material the user is consuming, the user consuming the material including at least the user reading the material;
   capturing via at least one sensor device, a physiological pattern generated by the user while consuming the content;
   responsive to detecting that the physiological pattern represents an outlier indicating that the user does not understand the content, determining a term in the content for providing additional information, the term determined from the content based on user knowledge, frequency of the term appearing in previous content consumed by the user and popularity of the term;
   executing a search query with the determined term;
   filtering a result of the search query based on the user's knowledge; and
   presenting via the computer device the filtered result and at least one of the previous content containing the term the user has previously consumed.

2. The method of claim 1, wherein the presenting via the computer device comprises presenting an interactive user interface element on a display device coupled to the computer device, and responsive to detecting a selection of the interactive user interface element, presenting the filtered result and at least one of the previous content containing the term the user has previously consumed.

3. The method of claim 2, wherein responsive to detecting a selection of the interactive user interface element, registering and storing user consumption of the filtered result and at least one of the previous content containing the term the user has previously consumed in a database.

4. The method of claim 1, wherein the user consuming material via the computer device comprises navigating a web site and viewing the material presented on the web site.

5. The method of claim 1, wherein user consuming material via the computer device comprises reading an electronic book.

6. The method of claim 1, wherein the result comprises dictionary meaning of the term.

7. The method of claim 1, further comprising detecting that the physiological pattern represents an outlier by comparing the physiological pattern with previously observed physiological pattern of the user, and detecting a deviation in the physiological pattern from the previously observed physiological pattern.

8. A computer program product for automatically triggering a search query, the computer program product comprising a computer readable storage medium having program instructions embodied therewith, wherein the computer readable storage medium is not a transitory signal per se, the program instructions readable by a device to cause the device to perform a method comprising:
monitoring a user interaction with a computer device, the user interaction comprising at least user consuming material via the computer device;
identifying content of the material the user is consuming, the user consuming the material including at least the user reading the material;
capturing via at least one sensor device, a physiological pattern generated by the user while consuming the content;
responsive to detecting that the physiological pattern represents an outlier indicating that the user does not understand the content, determining a term in the content for providing additional information, the term determined from the content based on user knowledge, frequency of the term appearing in previous content consumed by the user and popularity of the term;
executing a search query with the determined term;
filtering a result of the search query based on the user's knowledge; and
presenting via the computer device the filtered result and at least one of the previous content containing the term the user has previously consumed.

9. The computer program product of claim 8, wherein the presenting via the computer device comprises presenting an interactive user interface element on a display device coupled to the computer device, and responsive to detecting a selection of the interactive user interface element, presenting the filtered result and at least one of the previous content containing the term the user has previously consumed.

10. The computer program product of claim 9, wherein responsive to detecting a selection of the interactive user interface element, registering and storing user consumption of the filtered result and at least one of the previous content containing the term the user has previously consumed in a database.

11. The computer program product of claim 8, wherein the user consuming material via the computer device comprises navigating a web site and viewing the material presented on the web site.

12. The computer program product of claim 8, wherein user consuming material via the computer device comprises reading an electronic book.

13. The computer program product of claim 8, wherein the result comprises dictionary meaning of the term.

14. The computer program product of claim 8, further comprising detecting that the physiological pattern represents an outlier by comparing the physiological pattern with previously observed physiological pattern of the user, and detecting a deviation in the physiological pattern from the previously observed physiological pattern.

15. A system of automatically triggering a search query, comprising:
at least one hardware processor;
a consumed content database storing summaries of consumed content and coupled to the hardware processor;
the hardware processor monitoring a user interaction with a display device, the user interaction comprising at least user consuming material displayed on the display device;
the hardware processor identifying content of the material the user is consuming, the user consuming the material including at least the user reading the material;
the hardware processor capturing via at least one sensor device, a physiological pattern generated by the user while consuming the content;
the hardware processor, responsive to detecting that the physiological pattern represents an outlier indicating that the user does not understand the content, determining a term in the content for providing additional information, the term determined from the content based on user knowledge, frequency of the term appearing in previous content consumed by the user and popularity of the term;
the hardware processor executing a search query with the determined term in the consumed content database and an internet;
the hardware processor filtering a result of the search query based on the user's knowledge; and
the hardware processor presenting the filtered result and at least one of the previous content containing the term the user has previously consumed via the display device.

16. The system of claim 15, wherein the hardware processor presents an interactive user interface element on the display device, and responsive to detecting a selection of the interactive user interface element, the hardware processor presents the filtered result and at least one of the previous content containing the term the user has previously consumed.

17. The system of claim 16, further comprising an additional information database storing registration of consumption of additional information and coupled to the hardware processor, wherein responsive to detecting a selection of the interactive user interface element, the hardware processor registering and storing user consumption of the filtered result and at least one of the previous content containing the term the user has previously consumed in the additional information database.

18. The system of claim 15, wherein the user consuming material comprises navigating a web site and viewing the material presented on the web site.

19. The system of claim 15, wherein user consuming material comprises reading an electronic book.

20. The system of claim 15, wherein the result comprises dictionary meaning of the term.

* * * * *